(12) United States Patent
Pahlevaninezhad et al.

(10) Patent No.: US 11,251,692 B2
(45) Date of Patent: Feb. 15, 2022

(54) LED LIGHTING SYSTEM AND A METHOD THEREFOR

(71) Applicant: 10644137 CANADA INC., Calgary (CA)

(72) Inventors: Majid Pahlevaninezhad, Calgary (CA); Sam Scherwitz, Calgary (CA); Dawood Shekari Beyragh, Calgary (CA)

(73) Assignee: 10644137 CANADA INC., Calgary (CA)

( * ) Notice: Subject to any disclaimer, the term of this patent is extended or adjusted under 35 U.S.C. 154(b) by 0 days.

(21) Appl. No.: 16/646,873

(22) PCT Filed: Sep. 20, 2018

(86) PCT No.: PCT/CA2018/051181
§ 371 (c)(1),
(2) Date: Mar. 12, 2020

(87) PCT Pub. No.: WO2019/056113
PCT Pub. Date: Mar. 28, 2019

(65) Prior Publication Data
US 2020/0278097 A1    Sep. 3, 2020

Related U.S. Application Data

(60) Provisional application No. 62/560,780, filed on Sep. 20, 2017.

(51) Int. Cl.
*H02M 1/10* (2006.01)
*H05B 47/185* (2020.01)
(Continued)

(52) U.S. Cl.
CPC ............. *H02M 1/10* (2013.01); *F21S 8/086* (2013.01); *F21S 9/035* (2013.01); *H05B 47/11* (2020.01);
(Continued)

(58) Field of Classification Search
CPC ........ F21S 9/035; F21S 9/032; H05B 47/105; H05B 47/185; H05B 47/37; H02M 1/10
See application file for complete search history.

(56) References Cited

U.S. PATENT DOCUMENTS

| | | | |
|---|---|---|---|
| 2009/0039797 A1* | 2/2009 | Wang ............... | H05B 31/50 315/246 |
| 2010/0182774 A1* | 7/2010 | Kugel ............... | H02J 7/0047 362/183 |
| 2017/0231053 A1* | 8/2017 | Underwood ........ | H04L 67/12 |

FOREIGN PATENT DOCUMENTS

| | | |
|---|---|---|
| CA | 2857497 A1 | 6/2013 |
| CA | 2858189 A1 | 6/2013 |
| CN | 105554945 A | 5/2016 |

OTHER PUBLICATIONS

International Search Report issued in corresponding Application No. PCT/CA2018/051181, dated Dec. 17, 2018.
(Continued)

*Primary Examiner* — Raymond R Chai
(74) *Attorney, Agent, or Firm* — Chamberlain, Hrdlicka, White, Williams & Aughtry

(57) ABSTRACT

A lighting system has a power source formed by a solar panel and a battery assembly, a lighting assembly having a plurality of lighting devices arranged into a plurality of lighting groups, the light assembly having a predetermined maximum power, and a multiple-input power converter electrically coupled to the power source and the lighting assembly for powering the lighting assembly using the power source, and for charging the battery assembly using
(Continued)

the solar panel. The multiple-input power converter is configured for calculating a power upper-bound based on the level of stored energy in the battery assembly and the length of a night time, and selecting at least a subset of the lighting groups and powering the selected lighting groups for illumination using the battery assembly for preventing exhausting the stored energy of the battery assembly before the battery assembly can be charged by the solar panel.

20 Claims, 5 Drawing Sheets

(51) Int. Cl.
*F21S 8/08* (2006.01)
*F21S 9/03* (2006.01)
*H05B 47/11* (2020.01)
*H05B 47/125* (2020.01)
*H05B 47/16* (2020.01)
*F21W 131/103* (2006.01)
*H05B 47/115* (2020.01)
*H05B 47/165* (2020.01)

(52) U.S. Cl.
CPC ........... *H05B 47/125* (2020.01); *H05B 47/16* (2020.01); *H05B 47/185* (2020.01); *F21W 2131/103* (2013.01); *H05B 47/115* (2020.01); *H05B 47/165* (2020.01)

(56) References Cited

OTHER PUBLICATIONS

Written Opinion issued in corresponding Application No. PCT/CA2018/051181, dated Dec. 17, 2018.

* cited by examiner

LED LIGHTING SYSTEM AND A METHOD THEREFOR

CROSS-REFERENCE TO RELATED APPLICATIONS

This application claims the benefit of U.S. Provisional Patent Application Ser. No. 62/560,780, filed Sep. 20, 2017, the content of which is incorporated herein by reference in its entirety.

FIELD OF THE DISCLOSURE

The present disclosure relates to lighting systems, and in particular to Light-Emitting Diode (LED) street-light systems using power converters, and to methods of controlling and powering the LEDs thereof.

BACKGROUND

Light-Emitting Diodes (LEDs) are known and have been widely used in industries, mostly as low-power light indicators. In recent years, LEDs having increased power outputs or increased luminous intensities have been developed and used for illumination. For example, LED lights provide improved energy efficiency, safety, and reliability, and are replacing other types of lights in the market such as incandescent lights, Compact Fluorescent Lamps (CFLs), and the like. As everyday lighting significantly contributes to the burden on power grids and greatly increases the overall requirements for electricity generation, the energy efficiency of LEDs will play a crucial role in future energy savings. It is likely that LEDs will dominate the lighting markets because of their superior energy efficiency.

High efficient LEDs have been replacing the conventional lighting solutions for street lights. LED street lights are a fast-growing industry because of various advantages provided by LEDs such as high light intensity, high energy efficiency, and high reliability. Because LED street lights need to be able to operate outdoor during harsh weather conditions for long periods of time, their reliability and robustness are of great importance.

Renewable energy systems and energy storage systems have been used in street-light systems. For example, a prior-art street light system usually comprises a photovoltaic (PV) panel for harvesting solar energy and a battery for storage of the harvested energy. The battery receives and stores the electrical power converted from solar energy by the PV panel during daytime, and powers the LED light at night.

FIG. 1 is a schematic diagram showing a prior-art LED street light system 10 having a PV panel 12 and a battery 14. As shown, the LED street-light system 10 comprises a LED light 16 installed on a post 18. The LED light 16 is connected to the battery 14, usually through a power converter (not shown). The PV panel 12 is also connected to the battery 14 for charging the battery 14 during daytime. The LED street light system 10 may also comprise an Alternate Current (AC) power input such as an AC utility power grid (not shown) for powering the LED light 16.

The battery 14 requires low temperature variations. Moreover, due to its heavy weight, the battery 14 is usually placed on or under ground. However, such an arrangement requires long wiring between the battery 14 and the LED light 16, and between the battery 14 and the PV panel 12. The long wiring may cause increased electrical resistance and increased waste power consumption by the long wiring. Such an issue is particularly significant for high-power LED lights such as lights for highways because of their low battery voltage and high current.

FIG. 2 is a block diagram of the prior-art LED street-light system 10 shown in FIG. 1. As shown, the LED street light system 10 comprises a plurality of multiple power converters. In particular, a first Direct-Current (DC) to Direct-Current converter (DC/DC converter) 24 converts the output of the PV panel 12 to a DC power suitable for charging the battery 14. The first DC/DC converter 24 may use maximum power point tracking (MPPT) for harvesting maximum available power from the PV panel 12 under applicable conditions.

The battery 14 is connected to the LED street light 16 via a second DC/DC converter 26. The second DC/DC converter 26 converts the DC output of the battery 26 to a voltage/current suitable for the LEDs 16.

The LED street light 16 is also powered by an AC power source 22 via an AC/DC converter 28 in case there is not enough energy stored in the battery 14.

There are various challenges and difficulties related to the prior-art LED street-light systems. For example,

- the long wiring between the battery 14 and other components such as the LED lights 16 and the PV panel 12 causes significant power loss. Thus, the overall energy efficiency of the street light system is usually poor;
- the system requires a plurality of power converters such as the power converters 24, 26 and 28 shown in FIG. 2, thereby causing increased system complexity, increased cost, and reduced reliability; and
- a utility power grid 22 is required for powering the system when the battery 14 does not have enough stored energy, thereby causing energy-demand burdens to the utility power grid 22.

SUMMARY

According to one aspect of this disclosure, therein is disclosed a lighting system. The lighting system comprises a solar panel, a battery assembly, a lighting assembly having a plurality of lighting devices arranged into a plurality of lighting groups, and a multiple-input power converter electrically coupled to the solar panel, the battery assembly, and the lighting assembly for powering the lighting assembly using the battery assembly and/or the solar panel, and for charging the battery assembly using the solar panel. When powering the lighting assembly using the battery assembly, the multiple-input power converter acts for determining a required period of time for powering the lighting assembly, determining the power level of the battery assembly, calculating a required power consumption rate based on the power level of the battery assembly and the required period of time, and electrically connecting one or more of the plurality of lighting groups to the battery assembly such that the power consumption rate of said one or more of the plurality of lighting groups is at or about the required power consumption rate.

In some embodiments, the lighting devices comprise Light-Emitting Diodes (LEDs).

In some embodiments, the solar panel, the battery assembly, the lighting assembly, and the multiple-input power converter are spatially close to each other.

According to one aspect of this disclosure, therein is disclosed a lighting system. The lighting system comprises: a power source having a solar panel and a battery assembly; a lighting assembly having a plurality of lighting devices arranged into a plurality of lighting groups, the light assembly having a predetermined maximum power; and a multiple-input power converter electrically coupled to the power source and the lighting assembly for powering the lighting assembly using the power source, and for charging the battery assembly using the solar panel. The multiple-input power converter is configured for: determining the start of a period of time with a predictable time length and during which the lighting assembly is to be powered by the battery assembly and the solar panel is not applicable for charging the battery assembly; determining a length of the period of time; determining a level of stored energy in the battery assembly; calculating a power upper-bound based on the level of stored energy in the battery assembly and the length of the period of time; comparing the power upper-bound with the maximum power of the lighting assembly and selecting at least a subset of the lighting groups having a total power smaller than or equal to the calculated power upper-bound; and powering the selected lighting groups using the battery assembly.

In some embodiments, said comparing and selecting step comprises: comparing the power upper-bound with the maximum power of the lighting assembly and selecting at least a subset of the lighting groups having a total power being the largest among all combinations of the lighting groups and smaller than or equal to the calculated power upper-bound.

In some embodiments, said comparing and selecting step comprises: if the power upper-bound is smaller than a minimum power of the lighting groups, selecting the lighting group having the minimum power.

In some embodiments, the lighting system further comprises a clock; and said determining the start of the period of time comprises: determining the start of the period of time using at least the clock.

In some embodiments, said determining the length of the period of time comprises: determining the length of the period of time using at least the clock.

In some embodiments, the lighting system further comprises a light sensor; and said determining the start of the period of time comprises: determining the start of the period of time using at least the light sensor.

In some embodiments, said determining the length of the period of time comprises: determining the length of the period of time using at least the light sensor.

In some embodiments, the lighting devices comprise Light-Emitting Diodes (LEDs).

In some embodiments, the solar panel, the battery assembly, the lighting assembly, and the multiple-input power converter are spatially positioned adjacent each other.

In some embodiments, the lighting system further comprises an alternate current (AC) power input for coupling to an AC power source and selectively powering the lighting assembly.

According to one aspect of this disclosure, therein is disclosed a method for powering a lighting assembly using a battery assembly. The lighting assembly comprises a plurality of lighting devices arranged into a plurality of lighting groups. The battery assembly is chargeable by a solar panel. The method comprises: determining the start of a period of time with a predictable time length and during which the lighting assembly is to be powered by the battery assembly and the solar panel is not applicable for charging the battery assembly; determining a length of the period of time; determining a level of stored energy in the battery assembly; calculating a power upper-bound based on the level of stored energy in the battery assembly and the length of the period of time; comparing the power upper-bound with the maximum power of the lighting assembly and selecting at least a subset of the lighting groups having a total power smaller than or equal to the calculated power upper-bound; and powering the selected lighting groups using the battery assembly.

In some embodiments, said comparing and selecting step comprises: comparing the power upper-bound with the maximum power of the lighting assembly and selecting at least a subset of the lighting groups having a total power being the largest among all combinations of the lighting groups and smaller than or equal to the calculated power upper-bound.

In some embodiments, said comparing and selecting step comprises: if the power upper-bound is smaller than a minimum power of the lighting groups, selecting the lighting group having the minimum power.

In some embodiments, said determining the start of the period of time comprises: determining the start of the period of time using at least a clock.

In some embodiments, said determining the length of the period of time comprises: determining the length of the period of time using at least the clock.

In some embodiments, said determining the start of the period of time comprises: determining the start of the period of time using at least a light sensor.

In some embodiments, said determining the length of the period of time comprises: determining the length of the period of time using at least the light sensor.

BRIEF DESCRIPTION OF THE DRAWINGS

The embodiments of the present disclosure will now be described with reference to the following figures in which identical reference numerals in different figures indicate identical elements, and in which.

DETAILED DESCRIPTION

Embodiments herein disclose a LED lighting system which may be a LED street light in some embodiments. The LED lighting system disclosed herein comprises a plurality of power sources (also interchangeably denoted as energy sources), a multiple-input power converter, and a plurality of LEDs. The LED lighting system disclosed herein powers the LEDs in an efficient manner.

In some embodiments, the LED lighting system disclosed herein is an integrated LED lighting system having a multiple-input power converter for efficiently transferring power from a plurality of energy sources.

The multiple-input power converter adaptively adjusting the power output to the LEDs based on the needs (described later) for achieving prolonged lighting operation even when the battery assembly has low power, thereby increasing the reliability and flexibility of the LED lighting system. In some embodiments, the LED lighting system disclosed herein also comprises various ancillary sensors such as a light sensor, a camera, a motion sensor, and the like.

Figure 1:
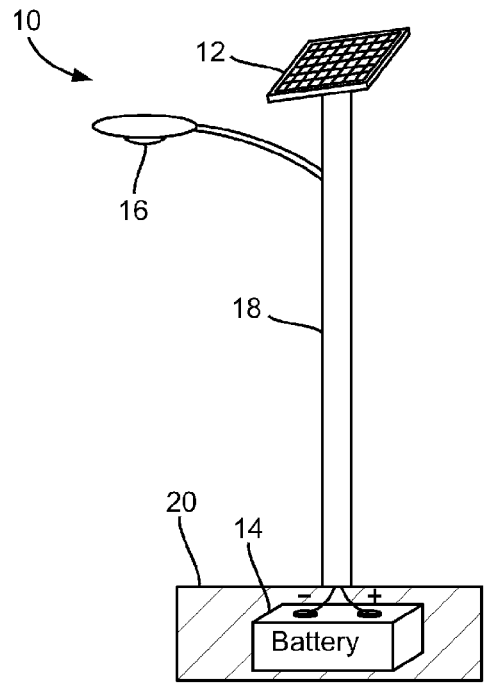
FIG. 1 is a schematic diagram of a prior-art street light system having a solar panel and a battery assembly.
Figure 2:
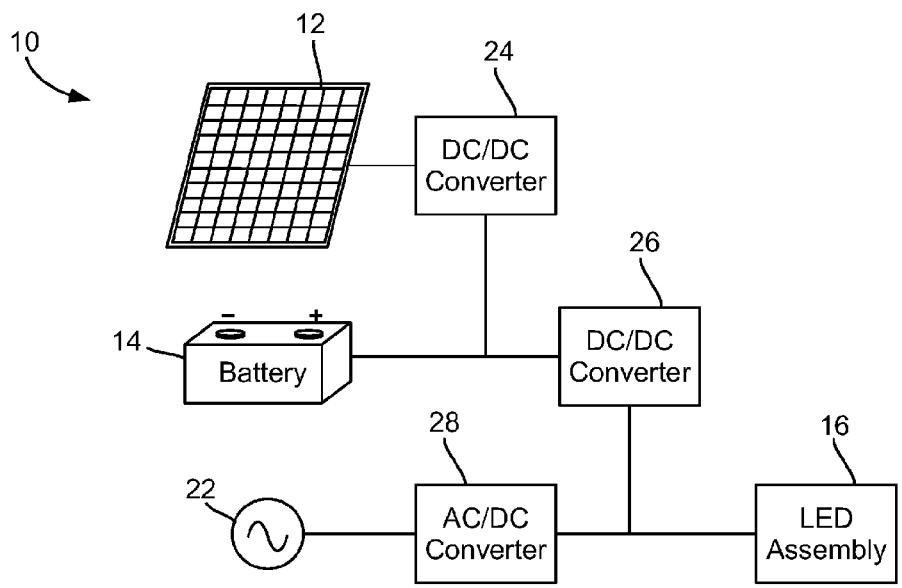
FIG. 2 is a block diagram of the prior-art LED street light system shown in FIG. 1.
Figure 3:
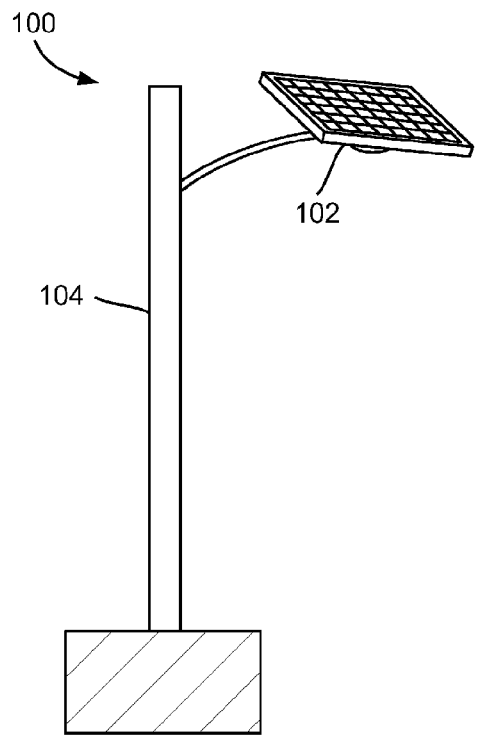
FIG. 3 is a schematic diagram of a LED lighting system, according to some embodiments of this disclosure.

Turning now to FIG. 3, a LED lighting system is shown and is generally identified using reference numeral 100, according to some embodiments of this disclosure. The LED lighting system 100 in these embodiments is a LED streetlight system and comprises a powering and lighting assembly 102 coupled to a post 104.

Figure 4A:
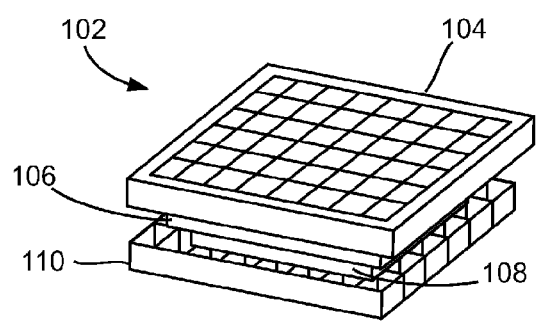
FIG. 4A is a schematic perspective view of a powering and lighting assembly of the LED lighting system shown in FIG. 3.
Figure 4B:
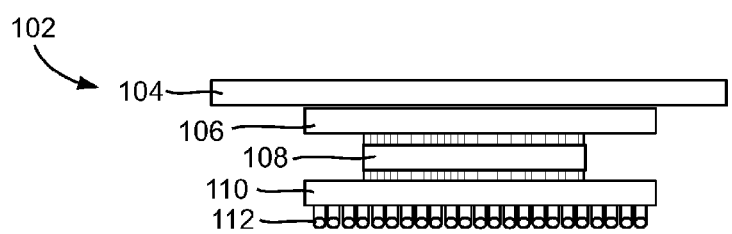
FIG. 4B is a schematic cross-sectional view of the powering and lighting assembly shown in FIG. 4A, the powering and lighting assembly comprising a solar panel, a battery assembly, a plurality of LEDs arranged into a plurality of LED lighting groups, and other components.

As shown in FIGS. 4A and 4B, the powering and lighting assembly 102 comprises a Photovoltaics (PV) panel 104, an energy storage device 106 such as a battery assembly having one or more battery cells, a multiple-input power converter 108, and an LED assembly 110 having a plurality of LEDs 112. All of these components 104 to 110 are integrated together, with the battery assembly 106 and the multiple-input power converter 108 sandwiched between the PV panel 104 and the LED assembly 110, thereby avoiding long lengths of wiring from the battery assembly 106. In these embodiments, the integrated powering and lighting assembly 102 also comprises one or more sensors (not shown).

As those skilled in the art will appreciate, the integrated powering and lighting assembly 102 may be enclosed in a housing (not shown) with the PV panel 104 facing a transparent portion of the housing for receiving therethrough sunlight, and the LED assembly 110 facing another transparent portion of the housing for providing a source of illumination.

Figure 5:
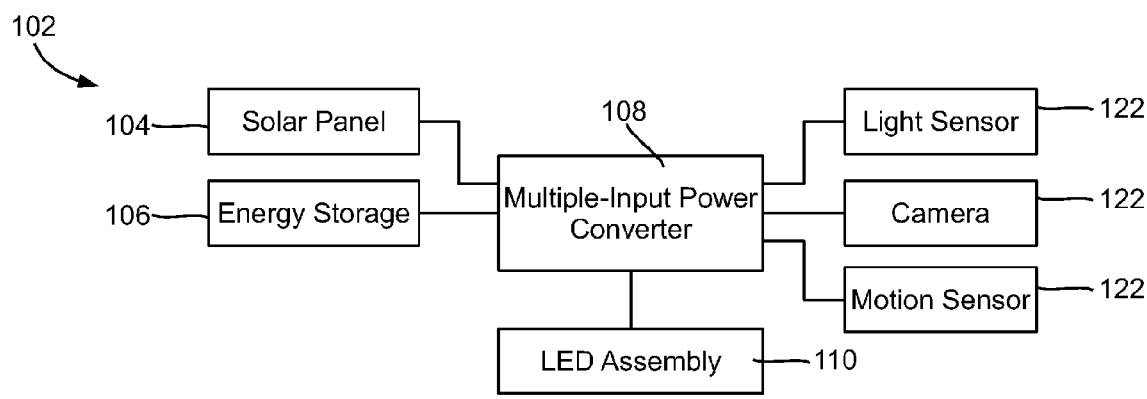
FIG. 5 is block diagram of the powering and lighting assembly shown in FIG. 4A.

FIG. 5 is a block diagram of the powering and lighting assembly 102. As shown, the multiple-input power converter 108 uses the energy from the solar panel 104 and/or the battery assembly 106 to power the LED assembly 110 at selective time periods and uses the energy from the solar panel 104 to charge the battery assembly 106. The multiple-input power converter 108 also receives sensor data from the sensors 122 such as one or more light sensors, cameras, and motion sensors, and uses the received sensor data to manage the charging of the battery assembly 106 and the powering of the LED assembly 110.

Figure 6:
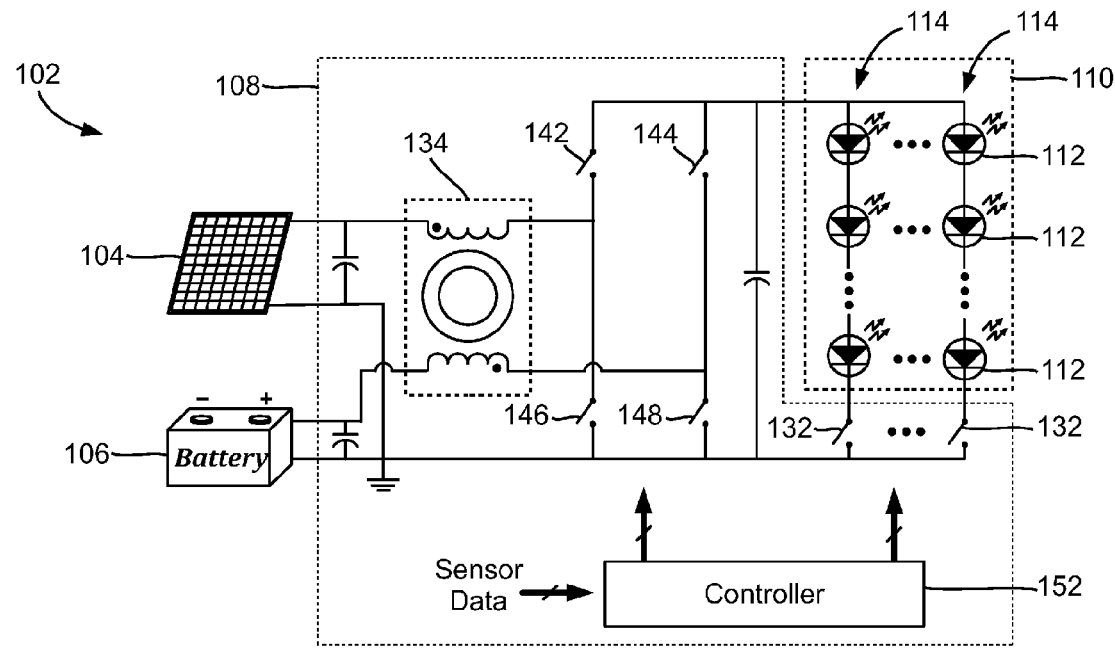
FIG. 6 is an electrical circuit diagram of the powering and lighting assembly shown in FIG. 4A.

FIG. 6 is an electrical circuit diagram of the powering and lighting assembly 102. As shown, the LEDs 112 of the assembly 110 are arranged into a plurality of LED lighting groups or columns 114. Each LED lighting group 114 is controlled by a group switch 132 of the multiple-input power converter 108 (described later). The grouping of the LEDs 112 may be based on any suitable criteria or as desired or needed. For example, in these embodiments, the grouping of the LEDs 112 is based on a requirement that the illumination of each LED lighting group 114 is higher than a minimum illumination level.

In this embodiment, the multiple-input power converter 108 is a switched DC/DC power convertor. The multiple-input power converter 108 comprises an inductor 134 such as a copper-core inductor, for processing the power obtained from the solar panel 104 and the power through the battery assembly 106. The multiple-input power converter 108 also comprises a set of control switches 142 to 148 controlled by a controller 152 and operate (i.e., switch on/off) at a predetermined high frequency for charging the battery assembly 106 and for powering LEDs 112.

In particular, the controller 152 receives the above-described sensor data from the light sensor 122 and configures the group switches 132 and the control switches 142 to 148 based on the received sensor data for charging the battery assembly 106 and for adjusting the lighting of the LED assembly 110. The controller 152 controls the control switches 142 and 146 to switch on/off (or close/open) at the predetermined frequency with the gate pulses for switches 142 and 146 being complementary to control the current coming out of the solar panel 104. The controller 152 also controls switches 144 and 148 to switch on/off at the predetermined frequency with the gate pulses for switches 144 and 148 being complementary to control the current through the battery assembly 106.

In these embodiments, the multiple-input power converter 108 uses maximum power point tracking for obtaining maximum available power output of the solar panel 104 under various conditions such as solar radiation, ambient temperature, solar cell temperature, and the like. As described above, the multiple-input power converter 108 manages the solar panel 104 to constantly charge the battery assembly 106 when ambient illumination is sufficient such as during most or all daytime hours when there is sufficient sunlight, and manages the battery assembly 106 to power the LEDs 112 at night time and/or as needed (e.g., the area about the LEDs 112 being dark during daytime hours).

At night time, the multiple-input power converter 108 (and more specifically a controlling circuitry thereof; described in more detail later) monitors the level of the energy stored in the battery assembly 106 and dynamically adjusts the power consumption of the LED assembly 110 by controlling the open/close of the group switches 132. In particular, the multiple-input power converter 108 repeatedly (such as periodically or alternatively in a random manner) executes an illumination process to operate the LED assembly 110 between a predetermined maximum power and a predetermined minimum power. Herein, the maximum power and minimum power refer to the energy consumption rates and may be conveniently described with a unit of Watt. The maximum power is substantially the total power of all LEDs 112 of the LED assembly 110 when all group switches 132 are closed. The minimum power is the smallest LED-column power of the LED columns 114. In embodiments that all LED columns have the same power (e.g., all LED columns having the same number of LEDs and all LEDs are of the same power level), the minimum power is the total power of the LEDs 112 of a LED column 114, and the LED assembly 110 may be configured to the minimum power by closing any one of the group switches 132 and open all other group switches. In embodiments that the LED columns have different power levels, the minimum power is the total power of the LEDs 112 of the LED column 114 that has the smallest power level, and the LED assembly 110 may be configured to the minimum power by closing the group switch 132 corresponding to the minimum-power LED column and open all other group switches.

Figure 7:
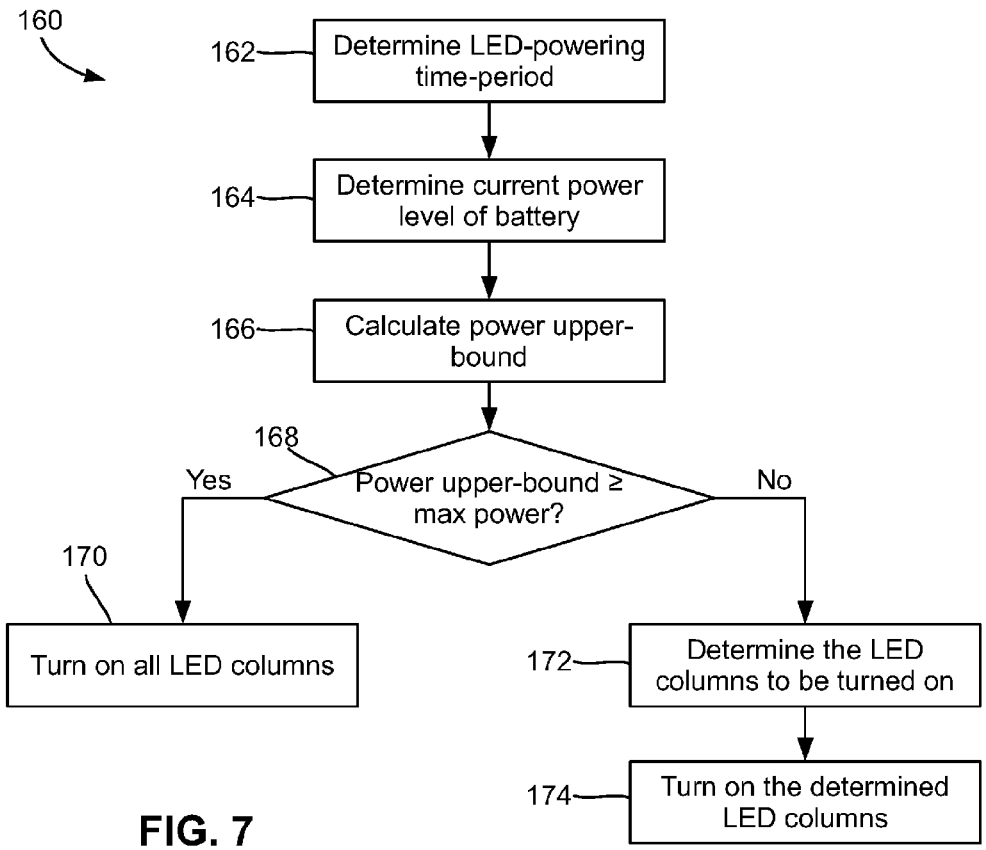
FIG. 7 is a flowchart showing the steps of an illumination process for selectively powering one or more LED lighting groups using the battery assembly during a night time.

FIG. 7 is a flowchart showing the illumination process 160.

The illumination process 160 starts when the controlling circuitry of the multiple-input power converter 108 determines that the LED assembly 110 is to be powered by the battery assembly 106 for a period of time for example, a night time, with a predictable time length and during which the solar panel 104 is not applicable for charging the battery assembly 106. In some embodiments, the start of such a period of time may be determined by using a clock or timer (e.g., determining the start of the night time using the clock). In some embodiments, the clock is configured for determining the current date and time. The controlling circuitry thus uses the current date and time for determining the start of the night time. In some embodiments, the start of the night time may be predetermined based on the current date and time and taking into account of the daylight-saving time if applicable.

In some other embodiments, a light sensor is used for determining the start of the night time. In some embodiments, a clock and a light sensor may be used for more accurately determining the night time.

After the illumination process 160 starts, the controlling circuitry of the multiple-input power converter 108 determines the length of the above-described period of time (denoted a "required LED-powering time-period" hereinafter) such as the period of time for powering the LED assembly 110 from the current time to the sunrise time at which the solar panel 104 can start to charge the battery assembly 106 (step 162).

In some embodiments, the sunrise time may be determined based on the current date and may take into account of the daylight-saving time if applicable. In some alternative embodiments, the controlling circuitry determines the sunrise time using the sunrise time of the previous day. During the execution of the illumination process 160, the controlling circuitry uses a light sensor or monitors the output of the solar panel 104 to determine a time (denoted an "updated sunrise time" hereinafter) that the solar panel 104 starts to receive sufficient sunlight for charging the battery assembly 106. The controlling circuitry then stops the illumination process 160 and uses the updated sunrise time in step 162 during the next execution of the illumination process 160.

Referring to FIG. 7, the controlling circuitry of the multiple-input power converter 108 determines the current level of stored energy in the battery assembly 106 (step 164), and calculates a power upper-bound based on the level of stored energy in the battery assembly 106 and the length of the required LED-powering time-period (step 166). The calculated power upper-bound is the highest energy consumption rate of the LED assembly 110 that allows the battery assembly 106 to power the LED assembly 110 for at least the required LED-powering time-period, and is also a preferred LED energy consumption rate that may provide the maximum illumination without exhausting the stored energy of the battery assembly 106 before the battery assembly 106 can be charged by the solar panel 104.

Then, the multiple-input power converter 108 compares the calculated power upper-bound and the maximum power, and determines which LED columns 114 shall be powered such that the energy consumption rate of the LED assembly 110 is smaller than or equal to the preferred LED power consumption rate.

In particular, the controlling circuitry of the multiple-input power converter 108 checks if the calculated power upper-bound is greater than the predetermined maximum power (step 168).

If the calculated power upper-bound is greater than or equal to the maximum power, the battery assembly 106 thus has sufficient energy stored therein to power all LEDs to the sunrise time. Therefore, all group switches 132 are closed to allow the battery assembly 106 to power all LEDs 112 thereby obtaining maximum illumination (step 170).

If the calculated power upper-bound is smaller than the maximum power, the controlling circuitry of the multiple-input power converter 108 then selects one or more LED columns 114 that the total power thereof is smaller than or equal to the calculated power upper-bound (step 172). In embodiments where all LED columns 114 have the same power, the controlling circuitry of the multiple-input power converter 108 determines the number N of LED columns 114 that the total power thereof is smaller than or equal to the calculated power upper-bound, and may select any N LED columns. The selection of the N LED columns may be randomly or in an alternate manner such that each LED column 114 may have a comparable illumination time. In some embodiments, the controlling circuitry of the multiple-input power converter 108 at step 172 selects one or more LED columns 114 that have a total power being the largest among all combinations of the LED columns and smaller than or equal to the calculated power upper-bound. In this way, the energy consumption rate of the LED assembly 110 is at a maximum rate that is smaller than or equal to the preferred LED power consumption rate.

If the calculated power upper-bound is smaller than the minimum power, the LED column having the minimum power is selected.

At step 174, the group switches 132 corresponding to the selected one or more LED columns 114 are closed and other group switches are open for only turning on the selected LED columns 114 for illumination.

By using the process 160, the system 100 then provides the maximum illumination without exhausting the stored energy of the battery assembly 106 before the battery assembly 106 can be charged by the solar panel 104, or provides the longest illumination time if the stored energy of the battery assembly 106 is insufficient to power any LED column 114 to the sunrise time.

In some embodiments, when the system determines that the stored energy of the battery assembly 106 is insufficient to power any LED column 114 to the sunrise time, the multiple-input power converter 108 may also output a warning or an alert signal.

With above-described design, the resiliency of the powering and lighting assembly 102 is increased, and a utility power grid may not be required for powering the LED assembly 110.

In some embodiments, the powering and lighting assembly 102 may comprise an AC input for connecting to an AC utility power grid for powering the LED assembly 110. The powering and lighting assembly 102 in these embodiments is particularly suitable for upgrading existing AC-powered street lights and for use at locations where the utility grid and the required connections are already in place for the street light system.

Figure 8:
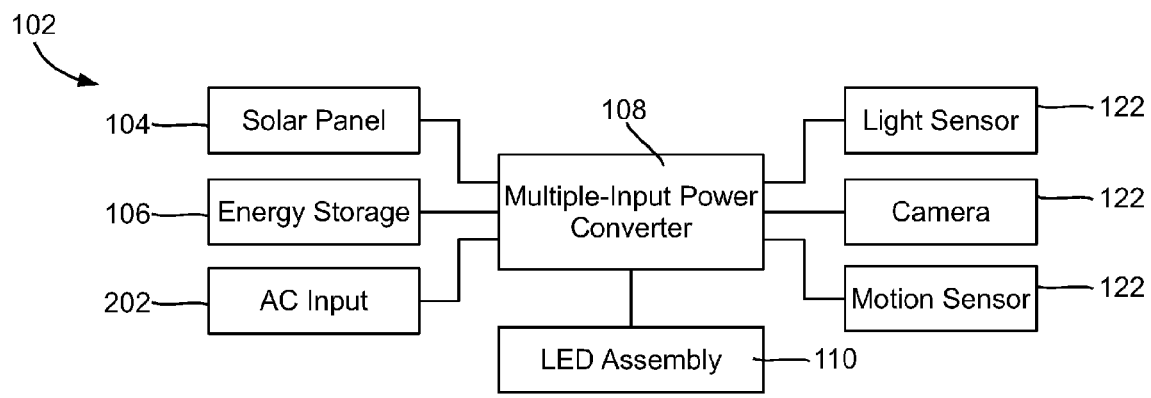
FIG. 8 is block diagram of the powering and lighting assembly shown in FIG. 4A having an Alternate Current (AC) input, according to some alternative embodiments of this disclosure.
Figure 9:
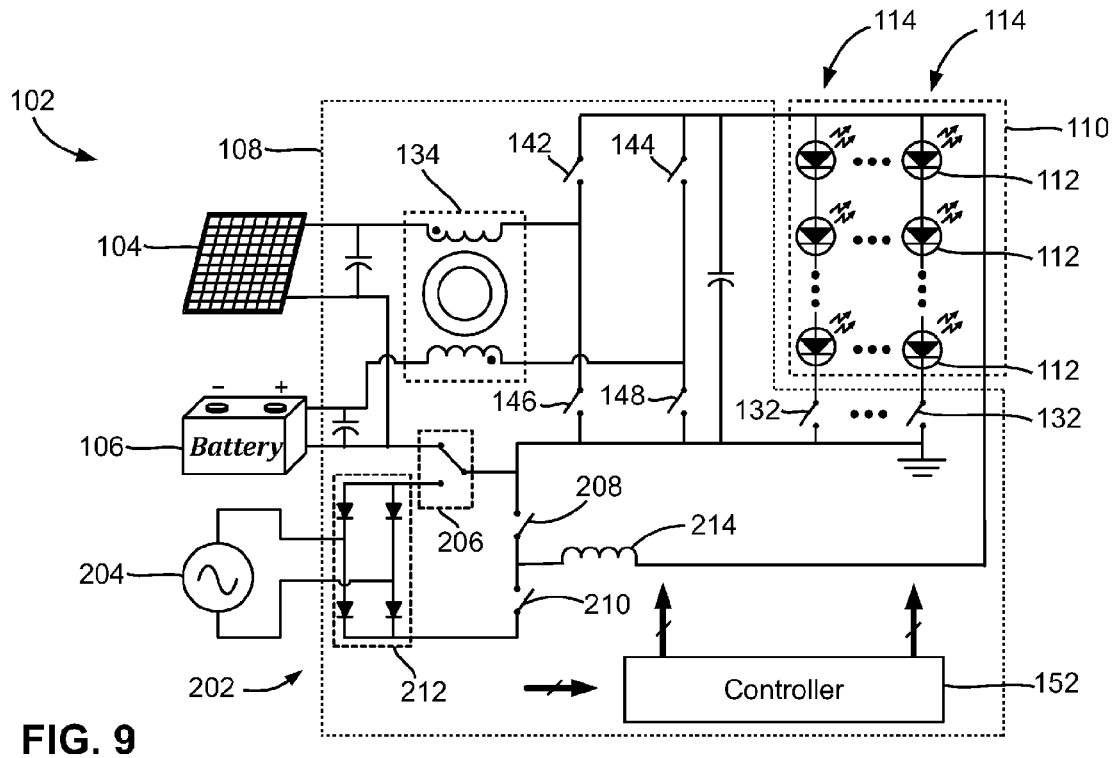
FIG. 9 is an electrical circuit diagram of the powering and lighting assembly shown in FIG. 8.

FIG. 8 is a block diagram of the powering and lighting assembly 102 in these embodiments. FIG. 9 is an electrical circuit diagram of the powering and lighting assembly 102 shown in FIG. 8.

The powering and lighting assembly 102 in these embodiments is similar to that shown in FIGS. 5 and 6 except that the powering and lighting assembly 102 in these embodiments further comprises an AC input 202 for connecting to an AC power source 204 such as an AC utility power grid as an additional power source for the LED assembly 110.

As shown in FIG. 9, the AC input 202 is electrically coupled to the LED assembly 110 via a three-way switch 206 which may be configured to switch between the solar panel 104 and battery assembly 106 to use the solar panel 104 and battery assembly 106 as the power source of the LED assembly 110, and the AC utility power grid 204 as the power source of the LED assembly 110. The AC circuit portion comprises a full-wave rectifier 212 for converting the AC power 204 to DC, a set of switches 208 and 210 operable (i.e., switching on/off) at a predetermined high frequency, and an inductor 214.

In the example shown in FIG. 9, the three-way switch 206 is configured to select the solar panel 104 and battery assembly 106 for powering the LED assembly 110.

Figure 10:
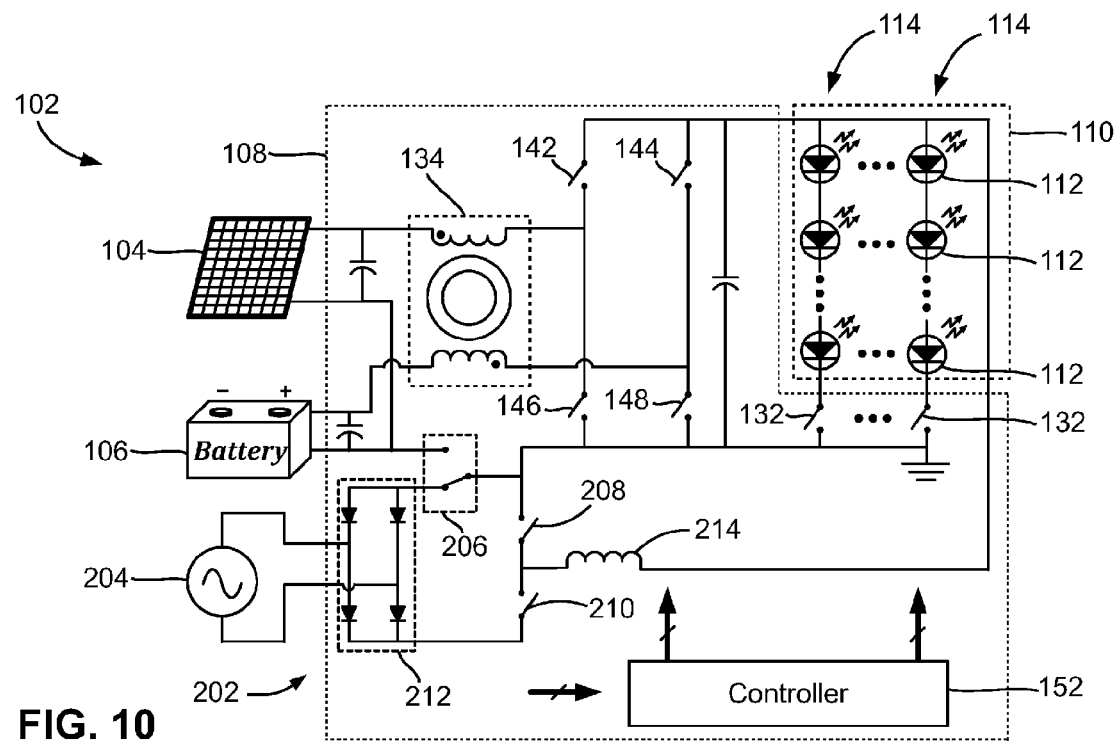
FIG. 10 shows the electrical circuit diagram of FIG. 9, wherein the electrical circuit is set to use the AC input for powering the LED assembly.

As shown in FIG. 10, the three-way switch 206 is configured to select the AC input 202 for powering the LED assembly 110. In this configuration, the controller 152 controls the switches 208 and 210 to switch on/off at a predetermined high frequency with the gate pulses for switches 208 and 210 being complementary to control the current flowing through the inductor 214 to control the amount of current flowing through the inductor 214 and in turn, the LEDs 112. As described above, the controller 152 may control the group switches 132 to adjust the load and illumination. Those skilled in the art will also appreciate that, while the AC input 202 is used for powering the LED assembly 110, the solar panel 104 may still be used for charging the battery assembly 106 by setting the switches 142 and 144 to close and setting the switches 146 and 148 to open.

Although in above embodiments, the powering and lighting assembly 102 is an integrated device, in some alternative embodiments, the components thereof such as the solar panel 104, the multiple-input power converter 108 and/or the battery assembly 106 may be separately from each other but remain functionally coupled.

Although in above embodiments, the battery assembly 106 is spatially positioned close to the solar panel 104 and the LED assembly 110 to avoid long lengths of wiring, in some alternative embodiments, the solar panel 104 may be positioned at a selected distance from the battery assembly 106 and the LED assembly 110 at a location that may receive maximum sunlight illumination.

Although in above embodiments, LEDs are used for illumination, in some other embodiments, other types of lighting devices such as incandescent lights, Compact Fluorescent Lamps (CFLs), and the like may also be used for illumination.

Those skilled in the art will appreciate that the switches described above may be any suitable switching devices such as electrical-mechanical on-off switches, metal-oxide-semiconductor field-effect transistors (MOSFETs), and/or the like.

Although embodiments have been described above with reference to the accompanying drawings, those of skill in the art will appreciate that variations and modifications may be made without departing from the scope thereof as defined by the appended claims.

What is claimed is:

1. A lighting system comprising:
  a power source having a solar panel and a battery assembly;
  a lighting assembly having a plurality of lighting devices arranged into a plurality of lighting groups, the light assembly having a predetermined maximum power, and each lighting group being configured for independently turning on and off; and
  a multiple-input power converter electrically coupled to the power source and the lighting assembly for powering the lighting assembly using the power source, and for charging the battery assembly using the solar panel;
  wherein the multiple-input power converter is configured for:
    determining a start of a period of time during which the lighting assembly is to be powered by the battery assembly and the solar panel is not applicable for charging the battery assembly;
    determining a length of the period of time;
    determining a level of stored energy in the battery assembly;
    calculating a power upper-bound based on the level of stored energy in the battery assembly and the length of the period of time;
    comparing the power upper-bound with the maximum power of the lighting assembly;
    when the power upper-bound is smaller than the maximum power of the lighting assembly, selecting a subset of the lighting groups having an energy consumption rate being a maximum rate that is smaller than the calculated power upper-bound; and
    powering the selected lighting groups using the battery assembly and turning other lighting groups off.

2. The lighting system of claim 1, wherein said comparing and selecting step comprises:
  when the power upper-bound is smaller than a minimum power of the lighting groups, selecting the lighting group having the minimum power.

3. The lighting system of claim 1 further comprising a clock; and wherein said determining the start of the period of time comprises:
  determining the start of the period of time using at least the clock.

4. The lighting system of claim 3, wherein said determining the length of the period of time comprises:
  determining the length of the period of time using at least the clock.

5. The lighting system of claim 1 further comprising a light sensor; and wherein said determining the start of the period of time comprises:
  determining the start of the period of time using at least the light sensor.

6. The lighting system of claim 5, wherein said determining the length of the period of time comprises:
  determining the length of the period of time using at least the light sensor.

7. The lighting system of claim 1, wherein the lighting devices comprise Light-Emitting Diodes (LEDs).

8. The lighting system of claim 1, wherein the solar panel, the battery assembly, the lighting assembly, and the multiple-input power converter are spatially positioned adjacent each other.

9. The lighting system of claim 1 further comprising an alternate current (AC) power input for coupling to an AC power source and selectively powering the lighting assembly.

10. The lighting system of claim 9, wherein the multiple-input power converter comprises a third pair of switches configured for switching on/off at a third frequency for controlling a current for powering the lighting devices.

11. The lighting system of claim 10, wherein the multiple-input power converter is configured for providing third complementary gate pulses for controlling the third pair of switches.

12. The lighting system of claim 1, wherein the multiple-input power converter comprises at least one of:
  a first pair of switches, and a second pair of switches;

wherein the first pair of switches are configured for switching on/off at a first frequency for controlling a current outputting from the solar panel; and wherein the second pair of switches are configured for switching on/off at a second frequency for controlling a current to the battery assembly.

13. The lighting system of claim 12, wherein the multiple-input power converter is configured for providing at least one of:

first complementary gate pulses for controlling the first pair of switches; and second complementary gate pulses for controlling the second pair of switches.

14. The lighting system of claim 12, wherein the first and second pairs of switches are electrical-mechanical on-off switches and/or metal-oxide-semiconductor field-effect transistors (MOSFETs).

15. A method for powering a lighting assembly using a battery assembly, the lighting assembly comprising a plurality of lighting devices arranged into a plurality of lighting groups, the battery assembly being chargeable by a solar panel, and each lighting group being configured for independently turning on and off, the method comprising:

determining a start of a period of time during which the lighting assembly is to be powered by the battery assembly and the solar panel is not applicable for charging the battery assembly;

determining a length of the period of time;

determining a level of stored energy in the battery assembly;

calculating a power upper-bound based on the level of stored energy in the battery assembly and the length of the period of time;

comparing the power upper-bound with the maximum power of the lighting assembly;

selecting a subset of the lighting groups having an energy consumption rate being a maximum rate that is smaller than the calculated power upper-bound; and powering the selected lighting groups using the battery assembly and turning other lighting groups off.

16. The method of claim 15, wherein said comparing and selecting step comprises:

when the power upper-bound is smaller than a minimum power of the lighting groups, selecting the lighting group having the minimum power.

17. The method of claim 15, wherein said determining the start of the period of time comprises:

determining the start of the period of time using at least a clock.

18. The method of claim 17, wherein said determining the length of the period of time comprises:

determining the length of the period of time using at least the clock.

19. The method of claim 15, wherein said determining the start of the period of time comprises:

determining the start of the period of time using at least a light sensor.

20. The method of claim 19 wherein said determining the length of the period of time comprises:

determining the length of the period of time using at least the light sensor.

* * * * *